United States Patent
Aardema et al.

(10) Patent No.: US 7,258,234 B2
(45) Date of Patent: Aug. 21, 2007

(54) TRANSPARENT EGG CARTON WITH CLOSURE FLAP

(76) Inventors: Marvin Aardema, 1300 S. 83rd Ct., Palos Park, IL (US) 60464; Richard Aardema, 8056 Forestview Dr., Orland Park, IL (US) 60462; John Camphouse, P.O. Box 712, Tinley Park, IL (US) 60477

(*) Notice: Subject to any disclaimer, the term of this patent is extended or adjusted under 35 U.S.C. 154(b) by 0 days.

(21) Appl. No.: 10/778,669

(22) Filed: Feb. 12, 2004

(65) Prior Publication Data

US 2005/0178689 A1    Aug. 18, 2005

(51) Int. Cl.
*B65D 85/32* (2006.01)
(52) U.S. Cl. .................. 206/521.1; 206/521.8
(58) Field of Classification Search ............ 206/521.1, 206/521.8, 521.9
See application file for complete search history.

(56) References Cited

U.S. PATENT DOCUMENTS

| | | | | | |
|---|---|---|---|---|---|
| 2,771,233 | A | * | 11/1956 | Cox | 206/521.1 |
| 2,990,094 | A | * | 6/1961 | Reifers | 206/521.1 |
| 3,131,846 | A | * | 5/1964 | Whiteford | 206/521.8 |
| 3,138,314 | A | * | 6/1964 | Reifers et al. | 206/521.1 |
| 3,613,987 | A | * | 10/1971 | Laidman | 206/521.1 |
| 3,643,855 | A |   | 2/1972 | Donaldson | 229/2.5 |
| 3,643,857 | A | * | 2/1972 | Noguchi | 206/521.8 |
| 3,648,916 | A | * | 3/1972 | Commisso | 206/521.8 |
| 3,712,532 | A | * | 1/1973 | Alroy | 206/521.1 |
| 3,771,712 | A | * | 11/1973 | Richards | 206/521.1 |
| 3,779,370 | A | * | 12/1973 | Snow et al. | 206/521.8 |
| 4,553,692 | A | * | 11/1985 | Padovani | 206/521.1 |
| 5,494,164 | A | * | 2/1996 | Ramirez | 206/521.8 |
| 5,760,118 | A | * | 6/1998 | Sinclair et al. | 524/306 |
| 6,323,307 | B1 | * | 11/2001 | Bigg et al. | 524/306 |
| 6,740,731 | B2 | * | 5/2004 | Bigg et al. | 524/306 |

FOREIGN PATENT DOCUMENTS

JP    6-329182    * 11/1994

* cited by examiner

*Primary Examiner*—Bryon P. Gehman
(74) *Attorney, Agent, or Firm*—Dorsey & Whitney, LLP (57) ABSTRACT

Transparent egg cartons suitable for being made from a variety of transparent polymeric materials and particularly from polylactic acid or other biodegradable polymers are described. The egg cartons use a "W" shaped hinge or box hinge element for hingedly connecting the lid to the tray or a flap to the tray. The flap is made with lattice struts to increase the lateral strength thereof, and contains at least three button tabs for interlocking the flap with the lid. The lateral most button tabs are located about $\frac{1}{8}^{th}$ the length of the flap from the ends of the flap. The egg cartons have an awning portion that extends from the front surface of the lid to cover the "W" shaped hinge or box hinge when the lid is closed. A space is provided between the edge of the awning and the hinge for a consumer to place a finger for disengaging the lid from the flap.

24 Claims, 7 Drawing Sheets

TRANSPARENT EGG CARTON WITH CLOSURE FLAP

TECHNICAL FIELD

This invention relates to egg cartons, and more particularly to egg cartons made of transparent polymeric materials.

BACKGROUND OF THE INVENTION

Conventional egg cartons in wide use today are typically made either of a fibrous material, such as cardboard, or a foamed polymeric material, such as foamed polystyrene (Styrofoam™). While these materials are inexpensive to prepare they share the same disadvantage of being opaque, requiring a consumer to open the lid of the egg carton to inspect the eggs for damage.

Egg cartons made of a transparent polymeric materials, such as poly ethylene terephthalate (PET) polymers have also come into use, although to a more limited extent than cardboard and foamed polystyrene cartons. Such transparent egg cartons exhibit various disadvantages that result from the properties of the materials used. For example, while these materials are recyclable, they are not biodegradable. In addition, most plastic materials, such as PET, have too much resiliency to easily operate as a crease type hinge between the lid of the carton and the tray that holds the eggs.

Figure 1:
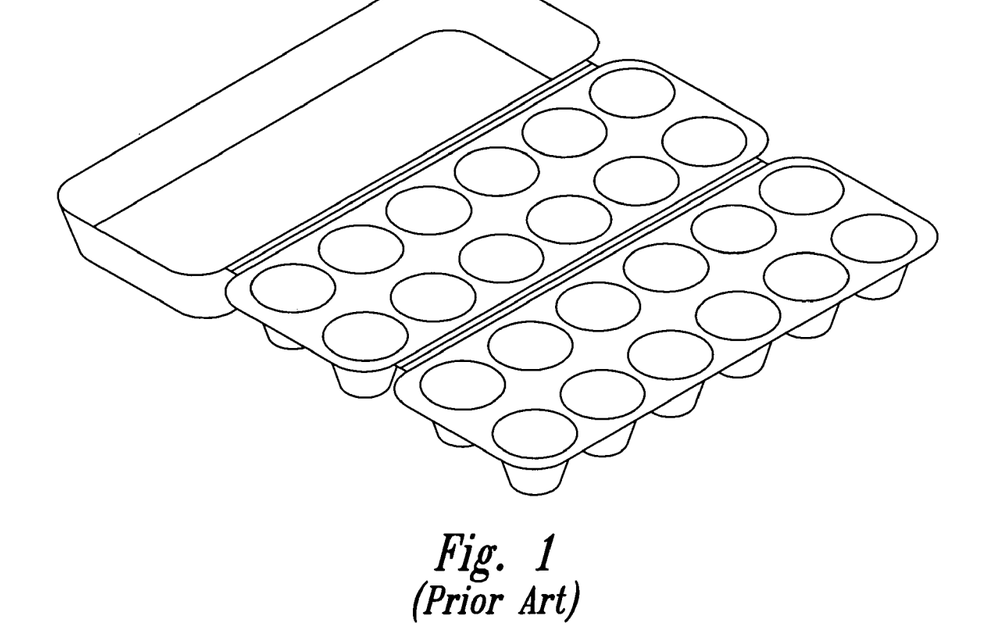
FIG. 1 is an isometric view of one transparent egg carton of the prior art.
Figure 2:
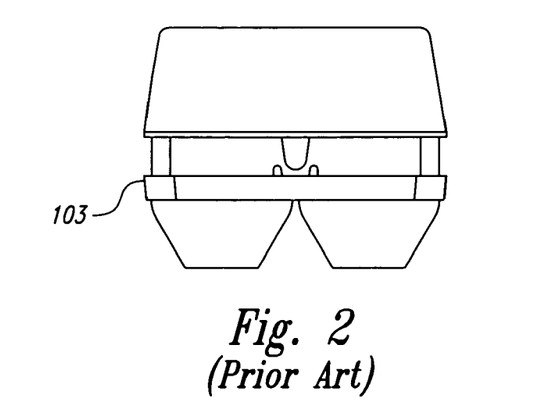
FIG. 2 is a plan view looking on the end of another transparent egg carton of the prior art.

One method of solving the hinge problem with transparent egg cartons is illustrated in FIG. 1 where the edges between the lid and the carton that define the hinge are connected by a series of micro-battens that extend into slots formed along the edges of the lid and the tray. The series of battens are more bendable than a creased strip of PET. A disadvantage of this design is that it is more costly to produce than a standard type of hinge, such as used with foamed polystyrene and cardboard cartons, where the hinge is formed by continuous crease in the strip of material that defines the junction between the base and lid. Another method of solving this problem is to use a two hinge design, where two rounded hinge portions of the plastic are separated by an intermediate panel as illustrated in FIG. 2. One problem with this design is that the lid must be closed by rotating about two axes rather than one, making proper alignment of the lid over the tray more difficult.

Another problem with hinge junctions for egg cartons made of transparent plastics relates to difficulty in securely interlocking the lid onto the tray. In the typical cardboard or foamed polystyrene carton, a front flap is provided on the front of the tray and the flap also has a crease hinge along the junction between the flap and the tray. The flap contains two tabs positioned to fit into two holes formed in corresponding positions of the front surface of the lid, each positioned about $\frac{1}{3}^{rd}$ the length of the flap from the edge. Because transparent polymeric materials tend to be relatively pliable, a full egg carton made with a flap and two tabs would tend to bend downwardly when grasped by the end, causing failure of the carton or premature release of the tabs from the lid. Moreover, because the resiliency of transparent polymeric materials is relatively large, a creased hinge for the flap has the same problems as a creased hinge for the lid.

One method to overcome this problem illustrated in FIGS. 1 and 2 is to dispense with the flap altogether. In the trifold design of FIG. 1, instead of using a flap, two lids are used. The first lid is conformed to fit over the top of the eggs, and the second lid is conformed to fit over the first lid. In the design of FIG. 2, instead of using a flap, the lid and tray of the carton are configured with a series of snap locks 103 around the rim. One problem with this design is that it is difficult to precisely align each of the snap locks into position. Another problem is that a relatively large amount of force is required to snap and unsnap the lid to the tray. Yet another method of solving this problem, exemplified by U.S. Pat. No. 4,240,575 is to form the locking flap and hinge at an obtuse angle so that the flap is situated in a partially closed position. However, this design does not eliminate the problem of bending of the egg carton when grasped from the end.

Another problem with resiliency in egg cartons made of transparent plastic materials is difficulty for a consumer to release the lid form the interlocking tabs and holes. In the cardboard or foamed polystyrene designs, the consumer typically pulls the front of the lid forward from the center to clear the holes from the tabs and rotates the lid upward to open the carton. However, if the flap and lid are made of typical transparent polymeric materials, which are more pliable than cardboard or foamed polystyrene, pulling the front surface of the lid forward from the middle creates a bow action that results in bowing of the middle of the flap outward and the lateral sides of the flap inward, making it difficult to release the lid from the button tabs on the flap. One method of overcoming this problem exemplified by U.S. Pat. No. 4,463,894 is to make the lateral portions of the flap thicker than the central portion to reduce the bowing effect. A problem with this design is that more material is required to form the flap.

Accordingly there is a need in the art to provide transparent egg cartons that have the advantages of cardboard and foamed polystyrene egg cartons while lacking the disadvantages inherent to cartons made of transparent polymeric materials.

SUMMARY OF THE INVENTION

Provided herein are transparent egg cartons of improved design. In one aspect there is provided an egg carton that includes a tray with a plurality of egg compartments, a lid hingedly connected to the tray, and a closure flap hingedly connected to a front surface of the tray. In various embodiments, the tray, lid and flap are all made of a transparent polymeric material and at least one of the lid and flap are connected to the lid by either a "W" shaped hinge or a box hinge.

In another aspect there is provided an egg carton formed of a transparent polymeric material selected from the group consisting of a polylactic acid polymer, a poly glycolic acid polymer, and a polylactic-glycolic acid co-polymer. Polylactic acid is one of the preferred transparent materials. Use of these biodegradable materials is made possible by the various design features provided herein including any one, or preferably a combination of features that include: use of the "W" shaped hinge or box hinge, the provision of lattice struts in the flap, the provision of three button tabs in the flap with the lateral buttons being located about $\frac{1}{8}^{th}$ the length of the flap from the edge, or the provision of vertical ribbing in the lid to provide additional mechanical strength to egg cartons made of these otherwise fragile materials.

In one exemplary embodiment, there is provided an egg carton made of polylactic acid and that includes: a tray having a lower portion defined by a plurality of egg compartments configured for receiving eggs, the tray having a tray front surface, a tray rear surface and tray end surfaces and an upper portion that defines a tray rim with a tray edge extending above the lower portion. Also included is a reversibly closeable lid configured to cover the tray when closed, the lid having a top surface, a lid front surface, a lid back surface and lid end surfaces, each of the front, back and end surfaces of the lid having a lower portion defining a lid rim with a lid edge. The lid is formed with vertical ribbing along its downwardly extending surfaces and has an undulated perimeter that provides additional strength to the lid by increasing the lineal footprint thereof. Also included is a flap rotatable along an axis parallel to the front surface of the tray, the flap having a rear edge connected to the tray, and a front edge opposite the rear edge and a width defined by a distance between the front and rear edges of the flap. The flap includes three tab buttons for interlocking with the lid, with the lateral tabs being located about $\frac{1}{8}^{th}$ the length of the flap from the end. The flap also includes lattice struts to increase the lateral strength of the flap. A "W" shaped hinge or box hinge is used to connect the flap to the front surface of the tray and the lid to the back surface of the tray.

DETAILED DESCRIPTION OF PREFERRED EMBODIMENTS

In the following detailed description of exemplary embodiments of the invention, reference is made to the accompanying drawings, which form a part hereof, and in which are shown, by way of illustration, specific exemplary embodiments in which the invention may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit or scope of the present invention. The following detailed description is, therefore, not to be taken in a limiting sense, and the scope of the present invention is defined only by the appended claims.

Described herein are various features for a transparent egg carton 10, which is suitable for embodiments using a variety of transparent polymeric materials, including, but not limited to relatively pliable recyclable polymeric materials such as polyethylene terephthalate (PET), which is an amorphous polyester; clarified polypropylene (CPP), which is polypropylene containing nucleating agents to increase clarity; styrene butadiene copolymers (SBC) without impact modifiers; copolymer blends of SBC with crystal polystyrene (cPS), which is commercially known as "K-Resin/Crystal™, oriented polystyrene (OPS); polyvinyl chloride (PVC); styrene acrylonitrile polymer (SAN); polymethyl methacrylate (PMM) and copolymers thereof, commercially known as plexiglass; and polycarbonate (PC). In advantageous embodiments, the features of the egg carton 10 are also suitable for a newer class of transparent polymeric materials that are recyclable and biodegradable. Examples of such polymeric materials include polylactic acid (PLA), polyglycolic acid (PGA) and polylactic acid-glycolic acid copolymers (PLGA). Until the present invention, such materials were not suitable for egg cartons because of their relatively low tensile strength and brittle properties. Surprisingly, however, in advantageous embodiments, the egg carton 10 is preferably made of PLA, PGA, or PLGA.

Figure 3:
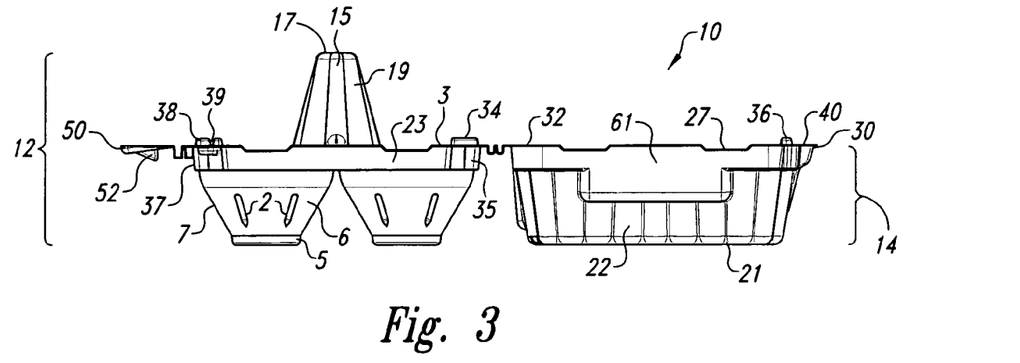
FIG. 3 is a plan view looking on an end of one embodiment of an open egg carton as provided herein.
Figure 4:
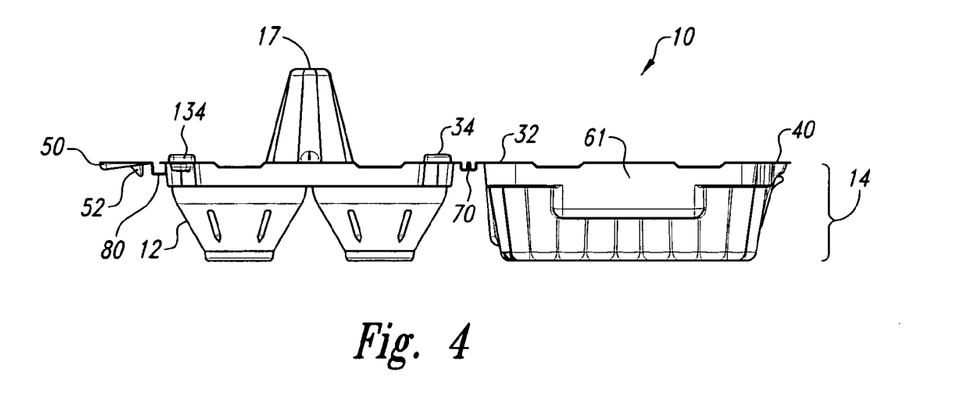
FIG. 4 is a plan view looking on an end of another embodiment of an open egg carton as provided herein.
Figure 5:
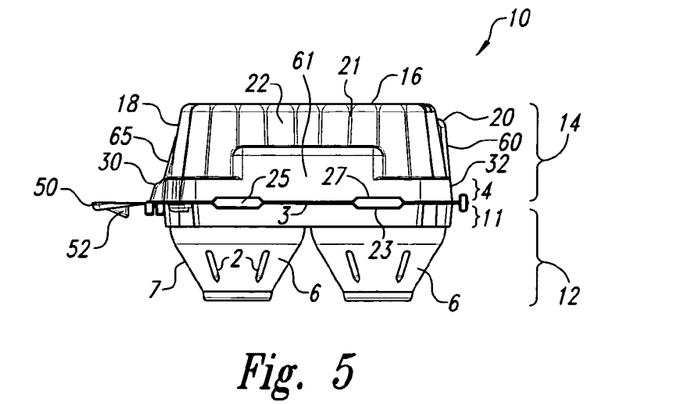
FIG. 5 is a plan view looking on the end of a closed, unlocked egg carton according to FIG. 3.

FIGS. 3-13 illustrate various views and features of transparent egg cartons 10 made of a transparent polymeric material as provided herein. FIG. 3 is an end view of one embodiment of the egg carton 10 in an open position. FIG. 4 is an end view of another embodiment of the egg carton 10 in an open position. FIG. 5 is an end view of the egg carton 10 of FIG. 3 in a closed and unlocked position. The egg carton 10 has a tray 12 that includes a lower portion 13 configured in a shape to receive a plurality of eggs, such as exemplified by the conical shaped egg compartments 7. The egg compartments 7 may be made in a variety of other shapes and sizes configured for receiving the generally ovoid shape of an egg, including for example, cup shapes, cylindrical shapes, polygonal shapes and the like. The tray also 12 includes an upper rim portion 11, which defines an outer perimeter of the tray 12 and that extends above the egg compartments 7.

The egg compartments 7 have interiorly directed side ridges 2 that contact the eggs keeping them away from the interior side walls 6 of the egg compartment 7. The egg compartments 7 also have a lower platform ridge 5 that prevents the bottom of the eggs from contacting the interior surface of the bottom of the egg compartment 7. The side ridges 2 and bottom ridges 5 are typically shaped so that the exterior side of the ridges 2, 5 form a generally concave contour and the interior side of the ridges 2, 5 that contacts the egg have a generally convex contour. As illustrated in the cut-away front view of FIG. 7 and the rear view of FIG. 6, an upper portion of adjacent egg compartments 7 that are arranged along the longitudinal axis of the tray 12 are interconnected by bracing elements 44 disposed between adjacent egg compartments 7. The bracing element 44 provides additional tensile strength along the longitudinal axis of the tray 12 to help prevent the egg carton from bending or breaking when loaded with eggs.

Within the interior of the tray 12 a plurality of tower elements 17 are formed between the egg compartments 7 in such a way that an interior facing surface 19 of the towers 17 are continuous with the interior surfaces 6 of a plurality of the egg compartments 7 to support the upper portions of the eggs in adjacent compartments 7. The interior facing surfaces 19 of the towers 17 are separated by tower support ridges 15. The lower portion of the tower ridges 15 are interconnected or integral with the bracing elements 44 between the egg compartments 7. The towers 17 are made of a sufficient height so that an upper surface of the towers 17 contacts an interior side of the top surface 16 of the lid 14 when the lid 14 is closed, thereby providing additional mechanical support to prevent the egg carton 10 from being crushed from above, for example, when multiple cartons are stacked on one other after being filled with eggs.

Referring again to FIG. 3, the tray rim 11 terminates in a tray edge 3, which in typical embodiments, is outwardly turned so that the tray rim 11 forms a lip with a horizontally disposed upwardly facing surface. At or near a rear corner 35 of the tray rim 11, there is provided a rear guide element 34, which is formed at or near the tray edge 3, for example, on the upper surface of the lip 11, and which extends upwardly therefrom to a point above the highest point of the tray rim 11. The outer surface of the rear guide element 34 is positioned interiorly from the outer perimeter of the tray rim 3 so that when the lid 14 reaches beyond a 90° angle with respect to the tray 12 when being closed, an inner corner surface 32 of the lid 14 is guided into position over the tray 12 by sliding over the outer surface of the rear guide element 34. The rear guide element 34 is advantageously configured with a curvilinear outer surface that is shaped to correspondingly conform with the inner corner surface 32 of the lid 14.

Figure 8:
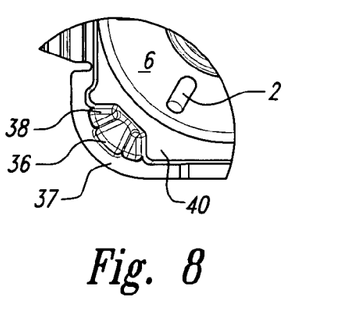
FIG. 8 is top view of a detail of a front corner of an egg carton as provided herein.
Figure 9:
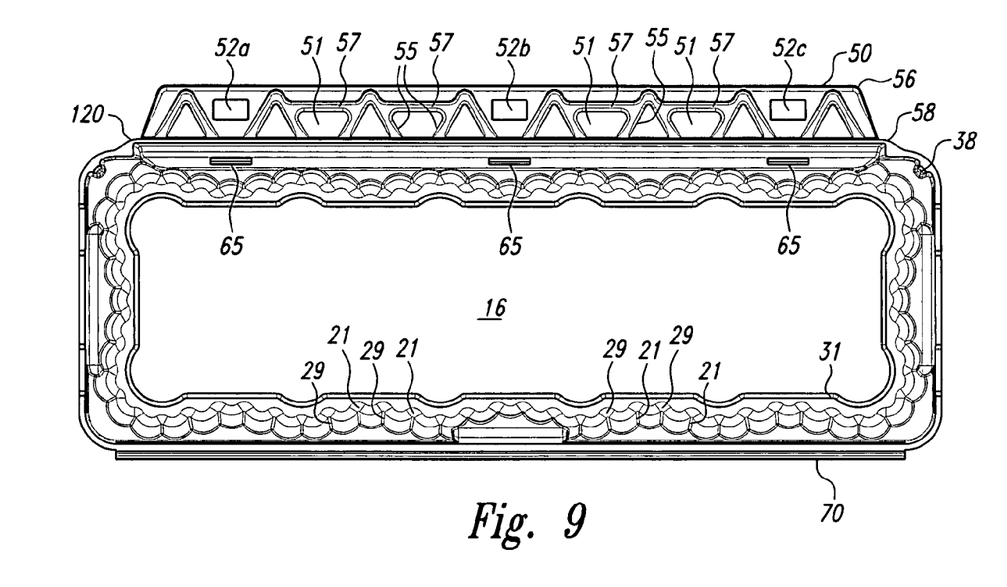
FIG. 9 is a top view of a lid of an egg carton as provided herein.

In certain embodiments, such as depicted in FIGS. 3, 8 and 9, a closure guide slot 38 is provided at a front corner 37 of the tray rim 11. The closure guide slot 38 is formed with a "female" recess 39 configured to slidably receive a "male" closure guide tab 36 positioned at a front corner 40 of the lid 14. Importantly, the closure guide slot 38 and the closure guide tab 36 do not form interlocking surfaces, such as in snap lock closure 103 of the prior art (see FIG. 2). Instead, the interior surfaces of the closure guide slot 38 and the outer surfaces of the closure guide tab 36 slidably contact one another, thereby facilitating accurate positioning of the lid 14 over the tray 12, without creating an interlocking connection that must be disconnected when opening the lid 14. The closure guide slot 38 and guide tab 36 may be formed in a variety of configurations with different geometries. FIG. 8 is a top view detailing the front tray corner 37 and the front lid corner 40 of the egg carton 10 in a closed position that illustrate one example configuration of the guide slot 38 and the guide tab 36. In this embodiment, the guide slot 38 is configured as a trapezoidal indentation formed on the tray rim 11 and the guide tab 36 is configured as correspondingly shaped protrusion formed on the lid rim 4.

Figure 12:
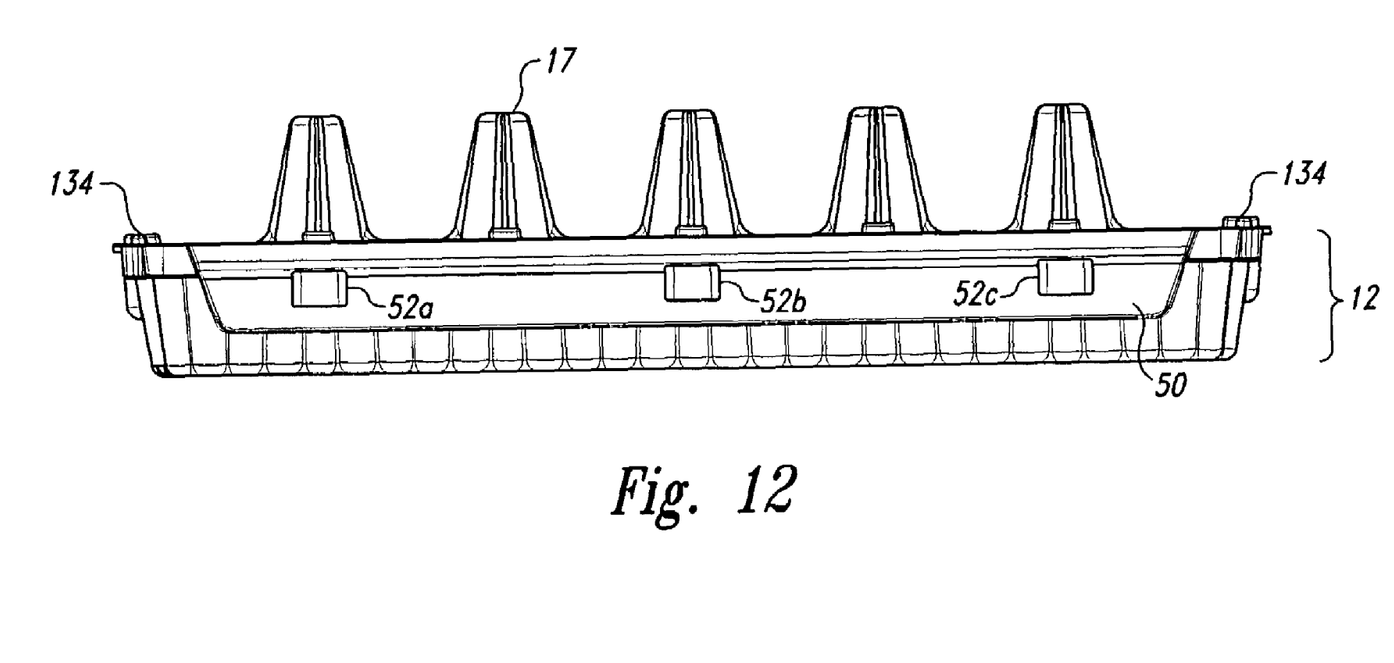
FIG. 12 is a front view of an egg carton of FIG. 4.
Figure 13:
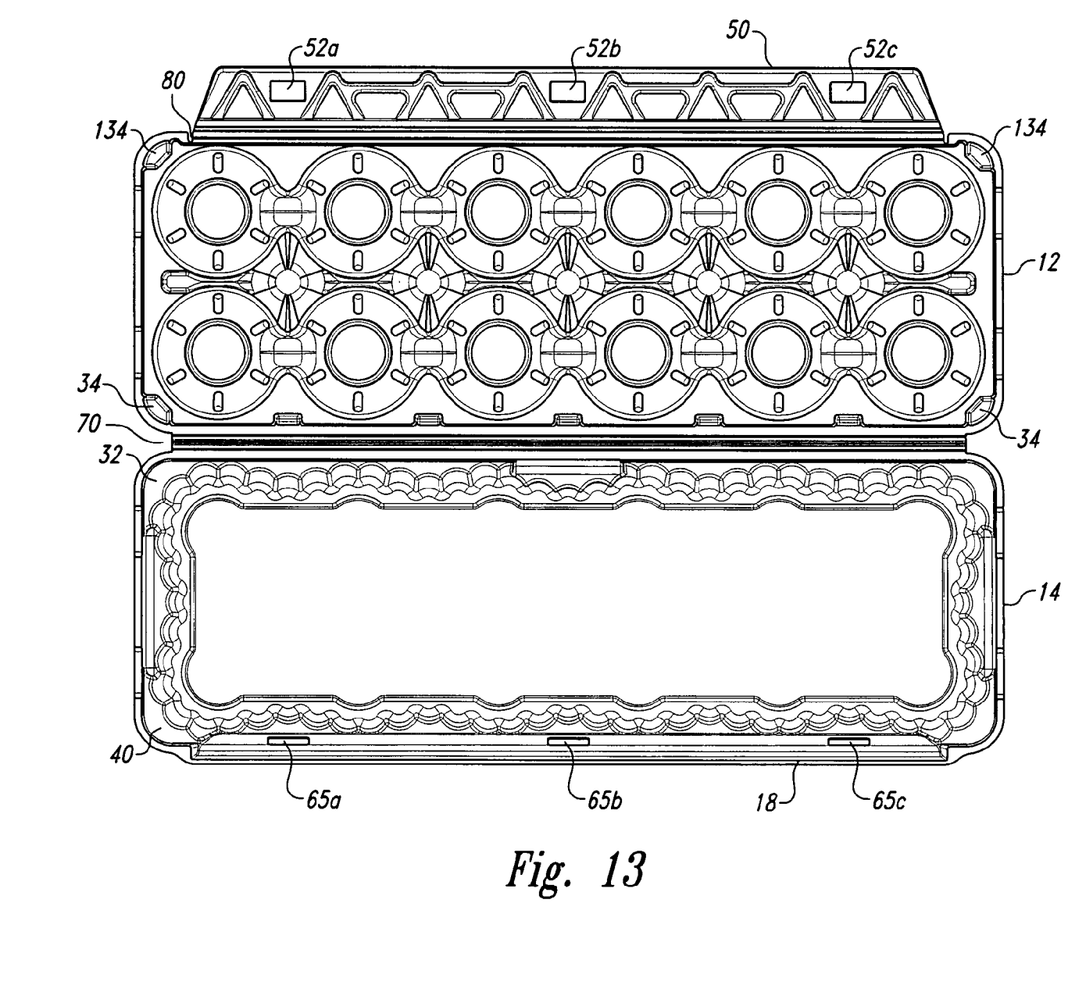
FIG. 13 is a top view of an open egg carton of FIG. 4.

In certain other embodiments, such a depicted in FIGS. 4, 12 and 13, instead of using a closure guide slot 38 and guide tab 36, a front guide element 134 analogous to the rear guide element 34 is provided in the front corners 37 of the tray 12. The front guide element 134 is formed on the upper surface of the tray rim 11. The outer surface of the front guide element 134 is positioned interiorly from the outer perimeter of the tray rim 3 so that when the lid 14 reaches beyond about a 160° angle with respect to the tray 12 when being closed, an inner corner surface 40 of the lid 14 is guided into position over the front of the tray 12 by sliding over the outer surface of the front guide element 34. The front guide element 134 is configured with a curvilinear outer surface that is shaped to correspondingly conform with the front corner surface 40 of the lid 14.

The lid 14 has a top surface 16, a front surface 18, a rear surface 20 opposing the front surface and opposing side surfaces 22, each of which extend downwardly from the from top surface 16. Three features of the lid 14 provide additional strength to the carton 10 to resist crushing when multiple cartons are stacked on one another, which is particularly advantageous for cartons made of pliable transparent materials. First, the front 18, rear 20 and side 22 surfaces of the lid 14 are heavily corrugated forming a plurality of parallel support ribs 21 separated by outwardly bulging areas 27 each extending vertically along the front 18, rear 20, and side 22 surfaces of the lid 14 between the top surface 16 and the lid rim 4. As illustrated in the top view of FIG. 9, the support ribs 21 are formed by folding the transparent polymeric material into a convoluted surface which surround voids 29 between adjacent rib folds 21. Preferably there are at least two, at least three or preferably at least four support ribs 21 per linear inch of the lid perimeter. This corrugation provide a substantial increase in the lineal footprint of the closed lid 14, thereby providing increased mechanical strength to the lid 14 to resist crushing. Second, as further illustrated in FIG. 9, the outer perimeter of the front 18, rear 20, and side 22 surfaces of the lid 14 are undulated, for example in a sinusoidal pattern, to further increase the lineal footprint area of the lid 14. Third, a perimeter portion 31 of the top surface 16 of the lid 14 is indented, which transmits load placed on the top surface 16 of the lid 14 to the load bearing ribs 21 along the front 18, rear 20, and end 22 surfaces.

Figure 6:
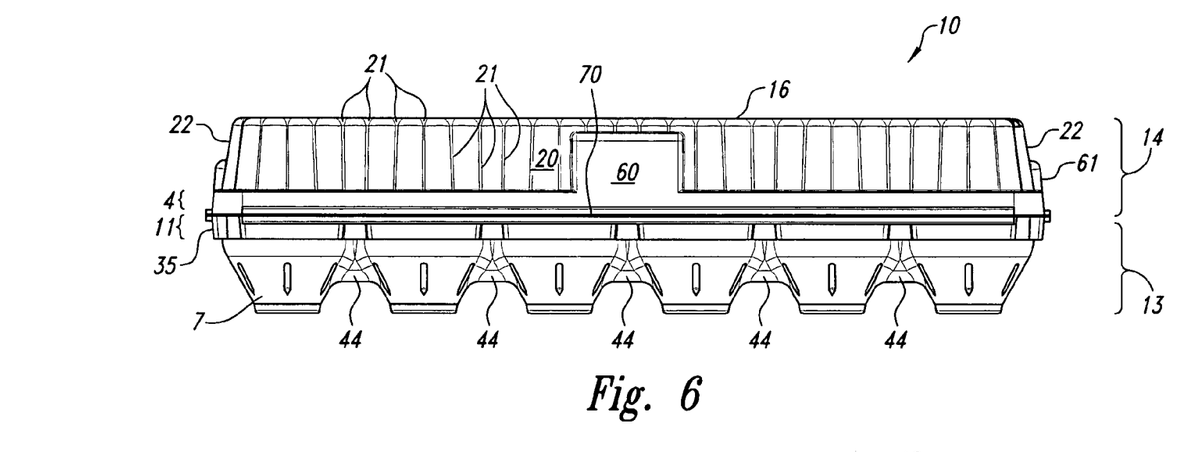
FIG. 6 is a cut-away plan view looking from the front of an egg carton as provided herein.
Figure 7:
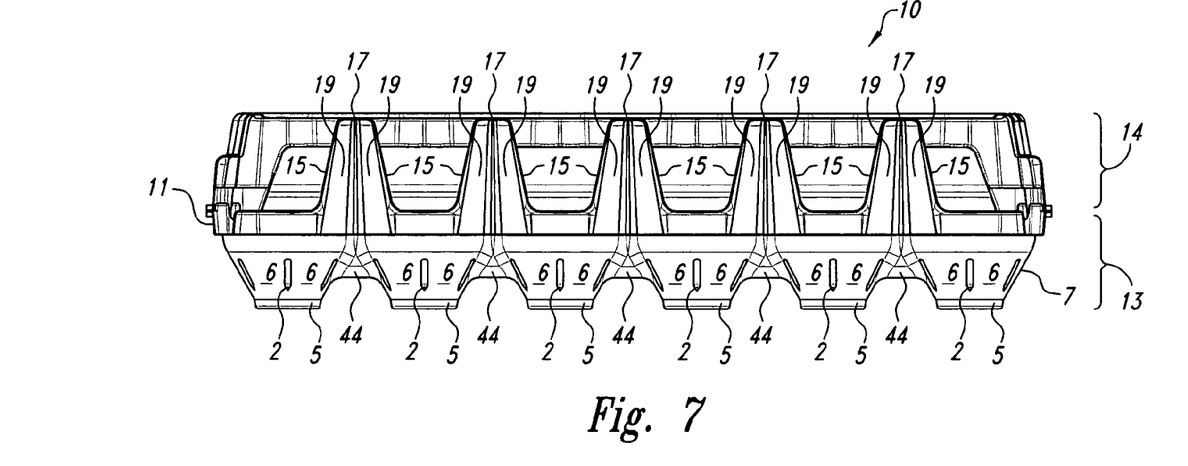
FIG. 7 is a rear plan view of an egg carton as provided herein.

Referring to FIGS. 5 and 6, the rear surface 20 of the lid 14 has a first flat portion 60 located beneath a shorter length of ribbing 21 that extends from the top surface 16 to the flat portion 60. As best illustrated in FIG. 6, the flat portion 60 is provided so that a label or code, such as a bar code, may be conveniently stamped on the lid 14. Similarly, referring to FIG. 5, at least one of the end surfaces 22 of the lid 14 has a second flat surface 61 located beneath a shorter portion of ribbing 21. The second flat surface 61 is provided so that an expiration date or other form of information regarding the packaged eggs may be stamped on the end 22 of the egg carton 10.

The lid 14 and the tray 12 are also constructed to form vents 25 when the egg carton 10 is closed. Eggs are typically packed into the egg carton 10 in a warm condition, then quickly moved to a refrigerated chamber to cool the eggs. This causes condensation to occur on the eggs if the egg carton 10 is not vented. Accordingly, the vents 25 are provided in the egg carton 10 to allow moisture to exhaust from the interior thereof. The vents 25 are formed by tray recesses 23 formed in the tray rim 3, which are correspondingly opposed to lid recesses 27 formed in the lid rim 4 so that the vent is formed when the lid 14 is closed.

Referring now to FIGS. 3-5, and 9 the egg carton 10 also includes a locking flap 50 hingedly connected to the front surface of the tray rim 11. While a locking flap 50 is conventional in fiber based and foamed polystyrene egg cartons, prior to the instant design, the dual problems of excessive pliability and resilience of transparent polymeric materials have not permitted use of flaps in egg cartons made of such materials. As mentioned in the Background section above, flaps made of plastic polymeric materials tend to bow when being unlocked. Moreover, even where the problem of bowing might be solved by increasing the thickness of the flap along the exterior lateral portions, another problem discovered by the inventors, is that the vertical (edge to edge) pliability of flaps made of clear polymeric materials is so great that a full egg carton 10, even containing the bracing elements 44 between the egg compartments 7, would still bend laterally downward when lifted from one end, causing the egg carton 10 to fail and/or the flap 50 to be released resulting in spilling of the eggs.

These problems are addressed herein by providing at least three additional features to the flap 50. First, the flap 50 is formed with a plurality of lattice struts 54 that extend across the flap 50 from a point at, or adjacent to, a front edge 56 of the flap to a point at or near a rear edge 58 of the flap 50. The lattice struts 54 are comprised of a vertical portion 55 and a horizontal portion 57 transversely oriented to the vertical portion 55. The vertical portion 55 extends across at least about 75% or at least about 80% or at least about 90% the width of the flap 50 between the front edge 56 and the rear edge 58. In the advantageous design depicted in FIGS. 8 and 13, the vertical portion 55 is arranged in a plurality of inversely oriented "V" shaped sections, that define a lattice of alternating triangular cross sectional areas 51 between the lattice struts 54. The lattice struts 54 may be formed by using a thicker dimension of the plastic material in the region forming the lattice struts 54, or by ribbing the plastic material by bending it into a raised surface above and/or below the adjacent cross sectional regions 51 between the lattice struts 54. Thus, the cross sectional areas 51 between the lattice struts 54 are thinner than, and/or indented with respect to, the outer surface of the lattice struts 54.

A second feature of the flap 50 provided herein, which is contrary in principle to the design of egg cartons generally, is the provision of at least three button tabs 52a, 52b, and 52c rather than two as in conventional egg carton designs. The button tabs 52 are adapted to fit into corresponding button holes 65 formed in the front surface 18 of the lid 14 to lock the lid 14 into place over the tray 12. In certain embodiments not illustrated herein, the button holes 65 may be replaced by closed pockets configured with a shape that corresponds to the shape of the button tabs 52. As a general principle in egg carton design according to the prior art, it was desirable to use only two button tabs 52a and 52c disposed on lateral sides of the flap 50, because egg cartons with additional button tabs 52 such as centrally located button tab 52b would generally be more cumbersome to open. However, it has been discovered that when the egg carton is made of a pliable transparent polymeric material such as PET or PLA, a third, centrally located button tab 52b prevents the egg carton 10 from bending downward when held at the end. In addition and surprisingly, the third button 52b actually makes the lid 14 easier to open, especially when used in combination with the other features of the transparent egg carton 10 described herein.

A third feature of the flap 50 is the location of the most lateral buttons 52a and 52c. In conventional egg cartons using only two buttons, these are each placed about $\frac{1}{3}^{rd}$ the length of the flap 50 from the edge. In the designs provided herein, the lateral buttons 52a and 52c are located at about $\frac{1}{10}^{th}$ to $\frac{1}{6}^{th}$, and most advantageously, about $\frac{1}{8}^{th}$ length of the flap 50 from edge. This location of the lateral buttons increases the overall strength of the closed egg carton 10, helping to prevent the closed egg carton 10 from buckling when grasped from the end.

Figure 10A:
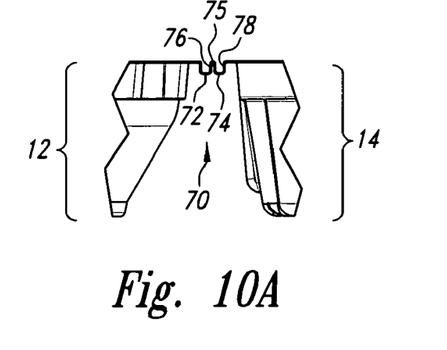
FIG. 10 depicts a "W" shaped hinge and a box hinge as used in the egg cartons provided herein.
Figure 10B:
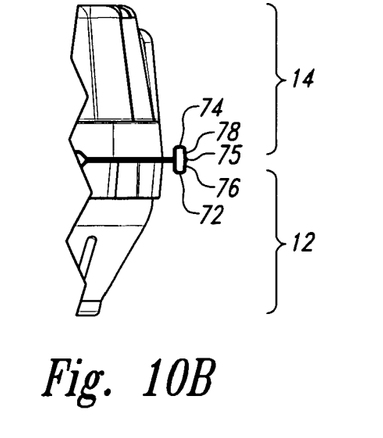

Another advantageous feature of the egg carton 10 is the use of a "W" shaped hinges 70 and/or box hinges 80 to connect the flap 50 and/or the lid 14 to the tray 12. Referring to FIGS. 10a and 10b, a "W" shaped hinge is characterized by having adjacent and symmetrical inner 72 and outer 74 depressions joined at an apex 75 defined by an apical junction where an outer wall 76 of the inner depression 72 meets an inner wall 78 of the outer depression 74 at an acute angle. When viewed from the end as depicted in FIGS. 3, 5 and 10, the adjacent depressions 72, 74 have a generally "W" shaped cross section when the hinge is an open position and the depressions 72, 74 are disposed at 0° from one another. When the hinge 70 is rotated inward 180° about an axis defined by a longitudinal length of the apex 75 the outer depression 74 folds over the inner depression 72 so that the outer wall 76 of the inner depression 72 meets the inner wall 78 of the outer depression 74 at an obtuse angle. The walls 72, 78 of the closed hinge 70 surround a void with a cross section having a mirror symmetry defined by the walls of the depressions 72 74. As depicted in the Figures, the "W" shaped hinge 70 is formed with adjacent "U" shaped depressions 72, 74, however, it is understood that the "W" shaped hinge may be formed with adjacent depressions 72, 74 of a variety of shapes, such as "V" shapes, square shapes, polygonal shapes and the like.

Figure 10C:
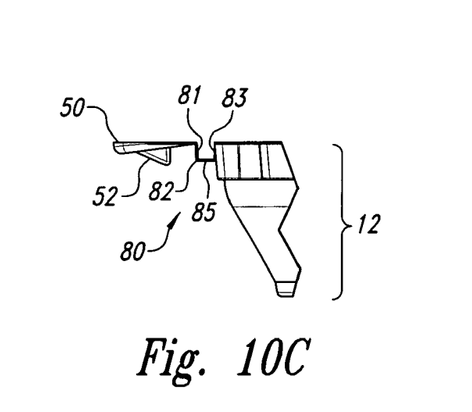
Figure 10D:
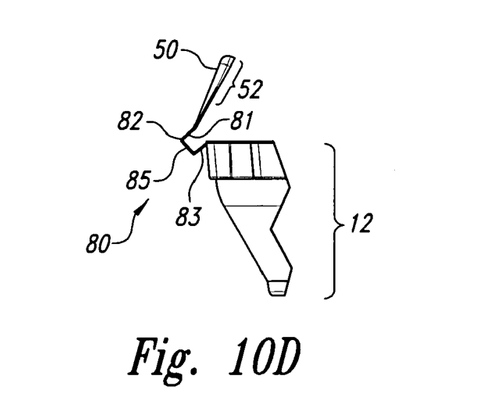

As illustrated in FIGS. 10c and 10d, the box hinge 80 is characterized by having single depression 82 defined by opposing side walls 81 and 83 interconnected by a bottom wall 85. The single depression 82 aids in rotating the flap 50 (or lid 14) about the axis defined by a longitudinal length down the center of the depression 82. In certain embodiments, as illustrated in FIG. 4, the egg carton 10 uses the box hinge 80 to interconnect the flap 50 to the tray 12 and uses the "W" shaped hinge 70 to interconnect the lid 14 to the tray 12. In other embodiments, the positions for the box hinge 80 and the "W" shaped hinge 70 may be reversed. In yet other embodiments, as depicted in FIGS. 3 and 5, both the lid 14 and the flap 50 are connected to the tray 12 using "W" hinges 70, while in still other embodiments (not illustrated), both the lid 14 and the flap 50 are connected to the tray 12 using the box hinges 80.

The "W" shaped hinge 70 and box hinge 80 of the egg carton 10 provides a variety of advantages to egg cartons made from pliable and/or resilient transparent polymeric materials. First, when the "W" shaped hinge is closed so that the walls of the derepressions 72, 74 meet at the obtuse angle, the walls of the inner depression 72 bear a portion of the weight of the attached lid 14 or flap 50. Second, the "W" shaped hinge and box hinge 80 are relatively easy to mold from a variety of transparent polymeric materials. Third, the "W" shaped hinge and box hinge 80 each extend outwardly from the from the front and rear surfaces of the rims 4, 11 of the lid 14 and the tray 12, respectively, which increases longitudinal rigidity of the egg carton 10. Fourth, these hinge types are suitable with transparent polymeric materials of different levels of pliability, such as PLA which is relatively more brittle and PET, which is relatively more pliable, because with these types of materials, the "W" shaped hinge 70 and box hinge 80 provide less resilience than a typical creased hinge of the prior art, making the carton 10 easier to open and close.

Figure 11:
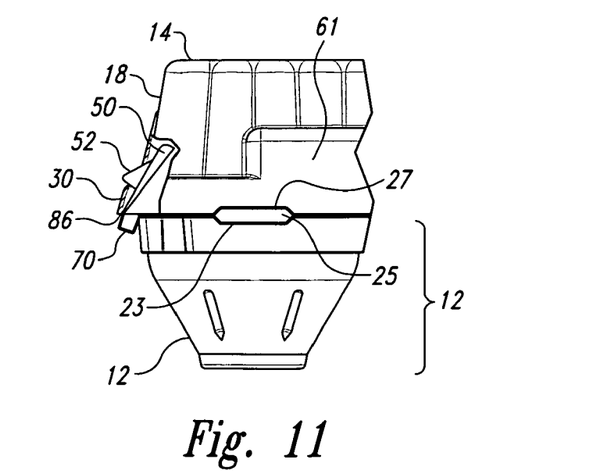
FIG. 11 is a side view of a detail of a closed and locked egg carton as provided herein.

Another feature of the egg carton 10 is that the front surface 18 of the lid 14 along the lid rim 4 is formed with an awning portion 30 that extends outwardly from the front surface 18 of the lid rim 4. As illustrated in the detail of FIG. 11, which is a cut-away side view of the egg carton 10 in a closed and locked position, the awning portion 30 is configured to fit over the "W" shaped hinge 70 (or box hinge 80) when the lid 14 is closed over the tray 12. This provides several advantages. One advantage is that absent the awning portion 30 the lid 14 would not fit properly over the tray 12 in a closed position because the "W" shaped hinge 70 or box hinge 80 would block the lower rim 4 of the lid 14 from rotating to a full 180° position when closed. In addition, the buttons 52 in the flap 50 would not fully engage the holes 65 (or pockets) formed in the front surface 18 of the lid 14 if the awning portion 30 were not present because the flap 50 and the front surface 18 of the lid 14 would not be properly aligned. Moreover, and unexpectedly, a space 86 formed between the rim of the awning portion 30 and the "W" shaped hinge 70 or box hinge 80 provides a convenient opening for a consumer to insert a finger tip under the rim 4 of the lid 14 to pull the lid 14 outward and upward to disengage the flap 50 from the lid 14 when opening the egg carton 10.

From the foregoing it will be appreciated that, although specific embodiments of the invention have been described herein for purposes of illustration, various modifications may be made without deviating from the spirit and scope of the invention. Accordingly, the invention is not limited except as by the following claims.

What is claimed is:

1. An egg carton comprising,
   a tray with a plurality of egg compartments,
   a lid hingedly connected to the tray;
   a closure flap hingedly connected to a front surface of the tray; the tray, lid and flap being made of a transparent polymeric material, the flap includes lattice struts formed in a plane of the flap extending between a front and a rear edge of the flap, the lattice struts include a vertical portion and a horizontal portion transversely oriented to the vertical portion forming a triangular shaped configuration within the plane; and
   at least one of the lid and flap are connected to the tray by at least one of a W-shaped hinge and a box hinge.

2. The egg carton of claim 1 wherein each of the lid and the flap are connected to the tray by a W-shaped hinge.

3. The egg carton of claim 1 wherein the flap is connected to the tray by the box hinge and the lid is connected to the tray by the W-shaped hinge.

4. The egg carton of claim 1 wherein the lattice struts have a vertical portion that extends at least 75% of a width defined by a distance between the front and rear edges of the flap.

5. The egg carton of claim 1 wherein the lattice struts have a vertical portion that extends at least 90% of a width defined by a distance between the front and rear edges of the flap.

6. The egg carton of claim 1 wherein the lattice struts have a greater thickness of the transparent material than regions of the flap adjacent to the lattice struts.

7. The egg carton of claim 1 wherein the lattice struts are comprised of ribbing that has raised portions of the transparent material relative to adjacent regions in the flap.

8. The egg carton of claim 1 wherein the egg carton contains at least three locking tabs on the flap arranged to interlock with at least one of corresponding holes and corresponding pockets in a front surface of the lid.

9. The egg carton of claim 8 wherein at least one of the at least three tabs is centrally located along a longitudinal dimension of the flap.

10. The egg carton of claim 8 wherein the at least three locking tabs include two tabs positioned $1/10^{th}$ $1/6^{th}$ to a length of the flap from opposite ends of the flap.

11. The egg carton of claim 8 wherein the at least three locking tabs include two tabs positioned about $1/8^{th}$ a length of the flap from opposite ends of the flap.

12. The egg carton of claim 1 wherein at least one of a front surface, a rear surface and an end surface of the lid is corrugated to form vertical ribbing between a top surface of the lid and a rim of the lid.

13. The egg carton of claim 12 wherein a perimeter region of a top surface of the lid is configured with indentations that transmit a mechanical load to the vertical ribbing.

14. The egg carton of claim 1 wherein at least one of a front surface, a rear surface and an end surface of the lid is formed into an undulating pattern defining a perimeter of a top surface of the lid.

15. The egg carton of claim 1 wherein at least one of a front surface, a rear surface and an end surface of the lid is corrugated to form vertical ribs between a top surface of the lid and a rim of the lid; wherein a perimeter region at a top surface of the lid is configured with indentations that transmit a mechanical load to the vertical ribbing and wherein at least one of the front surface, the rear surface and the end surface of the lid is formed into an undulating pattern defining a perimeter edge of the top surface of the lid.

16. The egg carton of claim 1 wherein a lid rim at an end surface of the lid is configured with a first recess, and a tray rim at an end surface of the tray is configured with a second recess, the first recess and the second recess together defining a vent aperture for the egg carton when the lid is closed.

17. The egg carton of claim 1 wherein the tray has a tray rim and a rear guide element located at a rear corner of the tray, positioned interior to, and extending above, the tray rim, and configured to guide an interior surface of a rear corner of the lid over an exterior surface of the guide element.

18. The egg carton of claim 17 wherein the tray has a tray rim and a front guide element located at a front corner of the tray, positioned interior to, and extending above, the tray rim, and configured to guide an interior surface of a front corner of the lid over an exterior surface of the front guide element.

19. The egg carton of claim 17 wherein the tray has a tray rim and a closure guide slot is located at a front corner of the tray rim and wherein the lid has a closure guide tab located at a front corner of the lid rim, the guide slot being configured to slidably mate with the guide tab as the lid is closed.

20. The egg carton of claim 1 wherein the lid has a front surface and a lid rim and the front surface has an awning portion that extends outward from the lid rim to cover the W-shaped hinge and is configured to provide a space between the awning portion and the W-shaped hinge when the lid is closed.

21. The egg carton of claim 1 further including a plurality of towers located in the tray between a plurality of adjacent egg compartments, each of the plurality of towers having an interior surface contiguous with an interior surface of the adjacent egg compartments.

22. The egg carton of claim 21 wherein the towers extend upward from a tray rim for a height sufficient to contact an interior surface of a top of the lid when the lid is closed over the tray.

23. The egg carton of claim 1 wherein the transparent polymeric material is selected from the group consisting of a polylactic acid polymer, a poly glycolic acid polymer, and a polylactic-glycolic acid co-polymer.

24. The egg carton of claim 23 wherein the material is polylactic acid.

* * * * *